(12) United States Patent
Shin et al.

(10) Patent No.: US 8,149,794 B2
(45) Date of Patent: Apr. 3, 2012

(54) CHANNEL ALLOCATION MANAGEMENT METHOD FOR TRANSFERRING ASYNCHRONOUS DATA, ASYNCHRONOUS DATA TRANSFERRING METHOD, AND APPARATUS THEREOF

(75) Inventors: Se-young Shin, Suwon-si (KR); Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 11/758,060

(22) Filed: Jun. 5, 2007

(65) Prior Publication Data

US 2007/0280184 A1    Dec. 6, 2007

(30) Foreign Application Priority Data

Jun. 5, 2006 (KR) .................. 10-2006-0050506
Mar. 12, 2007 (KR) .................. 10-2007-0024131

(51) Int. Cl.
*H04J 3/00* (2006.01)
(52) U.S. Cl. ......... 370/336; 370/229; 370/432; 370/349
(58) Field of Classification Search .................. 370/336, 370/328, 218, 229, 432, 349
See application file for complete search history.

(56) References Cited

U.S. PATENT DOCUMENTS

| | | | |
|---|---|---|---|
| 6,011,784 | A | 1/2000 | Brown et al. |
| 7,965,837 | B2 | 6/2011 | Kawasaki |
| 2003/0031146 | A1 * | 2/2003 | Sugaya ............... 370/336 |
| 2003/0063619 | A1 * | 4/2003 | Montano et al. ....... 370/443 |
| 2003/0152059 | A1 | 8/2003 | Odman |
| 2007/0153762 | A1 * | 7/2007 | Park et al. ............. 370/350 |

FOREIGN PATENT DOCUMENTS

| | | |
|---|---|---|
| EP | 0924896 A1 | 6/1999 |
| KR | 10 2003 0043296 A | 6/2003 |
| WO | 2004/100438 A2 | 11/2004 |

OTHER PUBLICATIONS

IEEE Standard for Information technology—Telecommunications and information exchange between systems—Local and metropolitan area networks—Specific requirements Part 15.3: Wireless Medium Access Control (MAC) and Physical Layer (PHY) Specifications for High Rate Wireless Personal Area Networks (WPANs), Published on Sep. 29, 2003.*
Chinese Office Action issued in corresponding Chinese Patent Application No. 200780016453.1 on Apr. 20, 2011.
Office Action issued on Sep. 22, 2011 by the State Intellectual Property Office of the P.R. of China in the corresponding Chinese Patent Application No. 200780016453.1.

(Continued)

*Primary Examiner* — Kent Chang
*Assistant Examiner* — Ronald Eisner
(74) *Attorney, Agent, or Firm* — Sughrue Mion, PLLC

(57) ABSTRACT

A method of managing channel allocation for asynchronous data transmission includes (a) broadcasting a first superframe for a first beacon period, the first superframe containing a control section and a data slot section; (b) receiving a request frame from at least one wireless device belonging to a network via the control section, the request frame requesting addition of a data slot for asynchronous data transmission; (c) transmitting a response frame to the at least one wireless device via the control section in response to the request frame; and (d) broadcasting a second superframe for a second beacon period, the second superframe containing information regarding a data slot added to the at least one wireless device.

23 Claims, 10 Drawing Sheets

OTHER PUBLICATIONS

Japanese Office Action issued on Jul. 19, 2011 in the corresponding Japanese Patent Application No. 2009-513064.
"IEEE Standard for Information technology—Telecommunications and information exchange between systems—Local and metropolitan area networks—Specific requirements" Part 15.3: Wireless Medium Access Control (MAC) and Physical Layer (PHY) Specifications for High Rate Wireless Personal Area Networks (WPANs), IEEE Computer Society, Sep. 29, 2003, 25 pages total.
Communication from the Japanese Patent Office, dated Nov. 25, 2011, issued in counterpart Japanese Application No. 2009-513064.

* cited by examiner

FIG. 5a

| Stream index | Stream request ID | Min_BW | Number of time blocks | Time block duration | Priority |
|---|---|---|---|---|---|
| 51 | 52 | 53 | 54 | 55 | 58 |

FIG. 5b

| TrgtID | Stream request ID | Stream index | Number of time blocks | Time block duration | Minimum Schedule period | Maximum Schedule period | Request control |
|---|---|---|---|---|---|---|---|
| 50a | 51a | 52a | 53a | 54a | 55a | 56a | 57a |

FIG. 6

| MAC HEADER | PAYLOAD | | | | |
|---|---|---|---|---|---|
| | FRAME TYPE | LENGTH | BWRp-1 | BWRp-2 ...... | BWRp-n |
| 20 | 61 | 62 | 63 | 64 | 65 |

60
30

CHANNEL ALLOCATION MANAGEMENT METHOD FOR TRANSFERRING ASYNCHRONOUS DATA, ASYNCHRONOUS DATA TRANSFERRING METHOD, AND APPARATUS THEREOF

This application claims priority from Korean Patent Application Nos. 10-2006-0050506 and 10-2007-0024131 filed on Jun. 5, 2006 and Mar. 12, 2007, respectively in the Korean Intellectual Property Office, the disclosures of which are incorporated herein by reference in its entirety.

BACKGROUND OF THE INVENTION

1. Field of the Invention

Apparatuses and methods consistent with the present invention relate generally to wireless communication technology, and more particularly to ensuring efficient and stable data transmission when large-capacity asynchronous data is transmitted wirelessly.

2. Description of the Prior Art

As generally known in the art, networks tend to be used on a wireless basis, and the request for large-capacity multimedia data transmission is ever-increasing. As a result, it is necessary to provide an efficient transmission method in wireless network environments. Considering the characteristics of wireless networks, in which different devices share and use given wireless resources, increased contention may cause collision during communication, which results in the loss of a large amount of data. This means that valuable wireless resources may be wasted. In order to reduce such collision or loss and guarantee stable data transmission/reception, it is customary to use a contention-based DCF (Distributed Coordination Function) or contention free PCF (Point Coordination Function) in wireless LAN (Local Area Network) environments and to use a type of time division, particularly channel time allocation, in wireless PAN (Personal Area Network) environments.

Although these methods may lessen collision and ensure stable communication to some degree when applied to wireless networks, the possibility that collision between transmitted data will occur is still higher than in the case of wired networks. This is because wireless network environments essentially have a large number of factors adversely affecting stable communication, such as multi-path properties, fading, and interference. In addition, the more wireless networks that participate, the higher the possibility of problems (e.g. collision, loss).

Such collisions require retransmission, which fatally affects the throughput of wireless networks. Particularly, in the case of AV (Audio/Video) data requiring a higher level of QoS (Quality of Service), it is a crucial issue to reduce the number of retransmissions and secure more bandwidth.

Considering the current trend of requesting wireless transmission of high-quality video, such as DVD (Digital Video Disk) images or HDTV (High Definition Television) between various home devices, there is now a need to provide technological standards for seamlessly transmitting/receiving high-quality video.

A task group under IEEE 802.15.3c is preparing a technological standard for transmitting large-capacity data in wireless home networks. This standard, commonly referred to as mmWave (Millimeter Wave), uses radio waves having milli-meter-grade physical wavelengths (i.e. radio waves having a frequency of 30-300 GHz) for large-capacity data transmission. Such a frequency domain has conventionally been used as an unlicensed band in limited applications (e.g., for communication business providers, for the purpose of radio-wave astronomy or vehicle collision prevention, etc.).

FIG. 1 shows a comparison between a frequency band based on an IEEE 802.11 series standard and one based on mmWave. It is clear from the drawing that IEEE 802.11b or IEEE 802.11g uses a band of 2.4 GHz and a channel bandwidth of about 20 MHz. In addition, IEEE 802.11a or IEEE 802.11n uses a band of 5 GHz and a channel bandwidth of about 20 MHz. In contrast, mmWave uses a band of 60 GHz and a channel bandwidth of about 0.5-2.5 GHz. This means that mmWave has a much larger frequency band and a smaller channel bandwidth compared with conventional IEEE 802.11 series standards.

As such, use of a high-frequency signal having a millimeter-grade wavelength (i.e. millimeter wave) guarantees that the transmission rate reaches the level of tens of Gbps and that the antenna has a size less than 1.5 mm. This means that a single chip incorporating an antenna can be implemented. In addition, a very high attenuation ratio in the air reduces interference between devices.

However, considering that the high attenuation ratio shortens the reach and that signals tend to propagate straightforward, proper communication can hardly be ensured in non-line-of-sight environments. Therefore, under mmWave it is proposed that the former problem be solved by using an array antenna having high gain and the latter problem by a beam steering scheme.

In addition to technology for transmitting compressed data by using a band of tens of Gbps based on conventional IEEE 802.11 series in home or office environments, it has recently been proposed to transmit uncompressed data by using a millimeter wave in a high-frequency band of tens of Gbps. As used herein, uncompressed data refers to data which is not compressed in terms of loss encoding. This means that loss-less encoding may be employed as long as complete restoration is guaranteed.

Particularly, uncompressed AV data is large-capacity data which has not been compressed, and cannot be transmitted but in a high-frequency band of tens of Gbps. Compared with compressed data, uncompressed AV data hardly affects the display even if there is a packet loss. This means that ARQ (Automatic Repeat Request) or retry is unnecessary. Therefore, it is requested to provide a method for ensuring efficient medium access so as to properly transmit uncompressed data in a high-frequency band (tens of Gbps) having the above-mentioned characteristics.

SUMMARY OF THE INVENTION

Accordingly, the present invention has been made to solve the above-mentioned problems occurring in the prior art, and the present invention provides a method for managing channel allocation, such as adding/returning a channel for transmitting asynchronous data by using a millimeter wave in a band of tens of GHz, a method for efficiently transmitting asynchronous data, and apparatuses for implementing the methods.

In addition, the present invention provides a frame ensuring flexibility in channel allocation for asynchronous data transmission.

Further to the above aspect, the present invention has additional technical aspects not described above, which can be clearly understood by those skilled in the art from the following description.

In accordance with one aspect of the present invention, there is provided an method of managing channel allocation for asynchronous data transmission, the method including (a)

broadcasting a first superframe for a first beacon period, the first superframe containing a control section and a data slot section; (b) receiving a request frame from at least one wireless device belonging to a network via the control section, the request frame requesting addition of a data slot for asynchronous data transmission; (c) transmitting a response frame to the at least one wireless device via the control section in response to the request frame; and (d) broadcasting a second superframe for a second beacon period, the second superframe containing information regarding a data slot added to the at least one wireless device.

In accordance with another aspect of the present invention, there is provided a method of managing channel allocation for asynchronous data transmission, the method including (a) broadcasting a first superframe for a first beacon period, the first superframe containing a control section and a data slot section; (b) receiving a request frame from at least one wireless device belonging to a network via the control section, the request frame requesting return of a data slot for asynchronous data transmission; and (c) broadcasting a second superframe for a second beacon period, the second superframe containing information regarding a data slot returned to the at least one wireless device.

In accordance with another aspect of the present invention, there is provided a method of transmitting asynchronous data, the method including (a) receiving a first superframe from a network coordinator for a first beacon period, the first superframe containing a control section and a data slot section; (b) transmitting a request frame to the network coordinator within the control section, the request frame requesting addition of a data slot for transmission of asynchronous data; (c) receiving a second superframe from the network coordinator for a second beacon period, the second superframe containing information regarding an added data slot; and (d) transmitting corresponding asynchronous data via the added data slot section.

In accordance with another aspect of the present invention, there is provided a method of transmitting asynchronous data, the method including (a) receiving a request frame from at least one device connected to a network via a first beacon section, the request frame requesting asynchronous data transmission; (b) transmitting a response frame to the device connected to the network in response to the request frame; and (c) transmitting asynchronous data to the device connected to the network based on the response frame.

In accordance with another aspect of the present invention, there is provided an apparatus for allocating a data slot for asynchronous data transmission, the apparatus including a unit broadcasting a first superframe for a first beacon period, the first superframe containing a control section and a data slot section; a unit receiving a frame from at least one wireless device belonging to a network within the control section, the frame requesting addition of a data slot for asynchronous data transmission; a unit transmitting a response frame to the at least one wireless device within the control section in response to the frame; and a unit broadcasting a second superframe for a second beacon period, the second superframe containing information regarding a data slot added to the at least one wireless device.

In accordance with another aspect of the present invention, there is provided an apparatus for allocating a data slot for asynchronous data transmission, the apparatus including a unit broadcasting a first superframe for a first beacon period, the first superframe containing a control section and a data slot section; a unit receiving a frame from at least one wireless device belonging to a network within the control section, the frame requesting return of a data slot for asynchronous data transmission; a unit transmitting a response frame to the at least one wireless device within the control section in response to the frame; and a unit broadcasting a second superframe for a second beacon period, the second superframe containing information regarding a data slot returned to the at least one wireless device.

In accordance with another aspect of the present invention, there is provided an apparatus for transmitting asynchronous data, the apparatus including a unit receiving a first superframe from a network coordinator for a first beacon period, the first superframe containing a control section and a data slot section; a unit transmitting a frame to the network coordinator within a control section contained in the first superframe, the frame requesting addition of a data slot for asynchronous data transmission; a unit receiving a second superframe from the network coordinator for a second beacon period, the second superframe containing information regarding an added data slot, and a unit transmitting asynchronous data via the added data slot section.

Particulars of other exemplary embodiments are incorporated in the following description and attached drawings.

BRIEF DESCRIPTION OF THE DRAWINGS

The above and other aspects, features and advantages of the present invention will be more apparent from the following detailed description taken in conjunction with the accompanying drawings, in which:

FIGS. 4, 5a, and 5b show the construction of data slot management slots according to exemplary embodiments of the present invention, respectively;

FIGS. 6, 7a, and 7b show the construction of response frames responding to data slot management frames according to exemplary embodiments of the present invention, respectively;

DETAILED DESCRIPTION OF THE EXEMPLARY EMBODIMENTS

Figure 1:
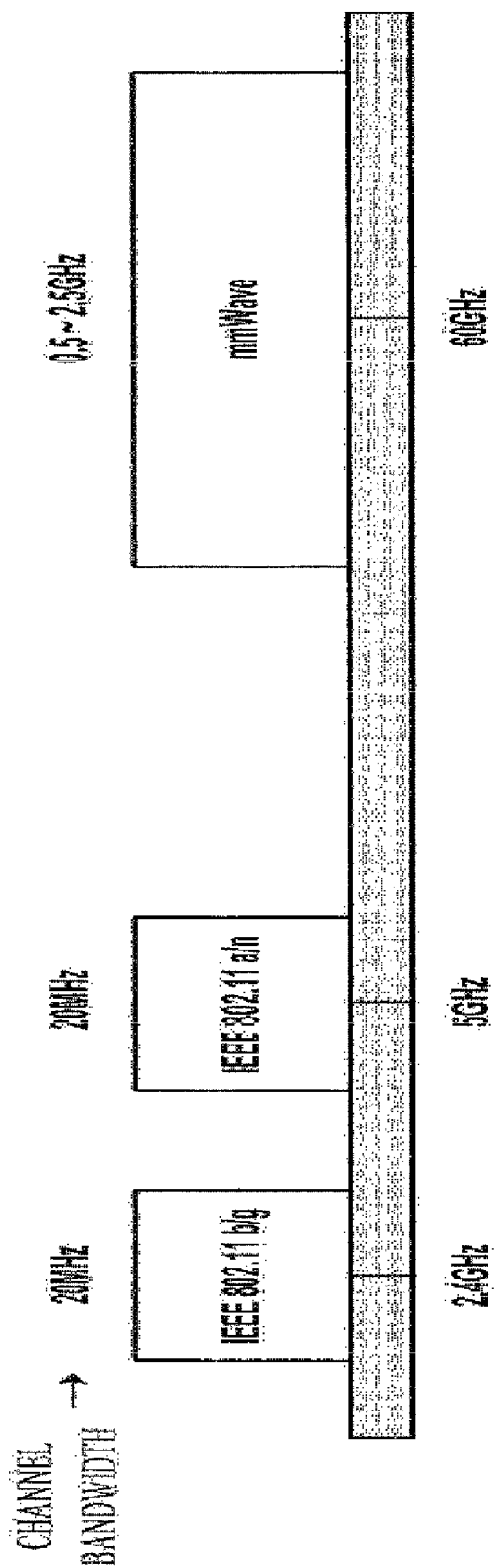
FIG. 1 shows a comparison between a frequency band based on an IEEE 802.11 series standard and that based on mmWave.

Aspects and advantages of the present invention will be apparent from exemplary embodiments of the present invention as will be described below together with the accompanying drawings. However, the scope of the present invention is not limited to such exemplary embodiments and the present invention may be realized in various forms. The exemplary embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

The present invention is described hereinafter with reference to block diagrams or flowcharts for illustrating a channel allocation management method for asynchronous data transmission, an uncompressed isochronous data transmission method, and apparatuses for implementing the methods according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Hereinafter, exemplary embodiments of the present invention will be described with reference to the accompanying drawings.

Figure 2A:
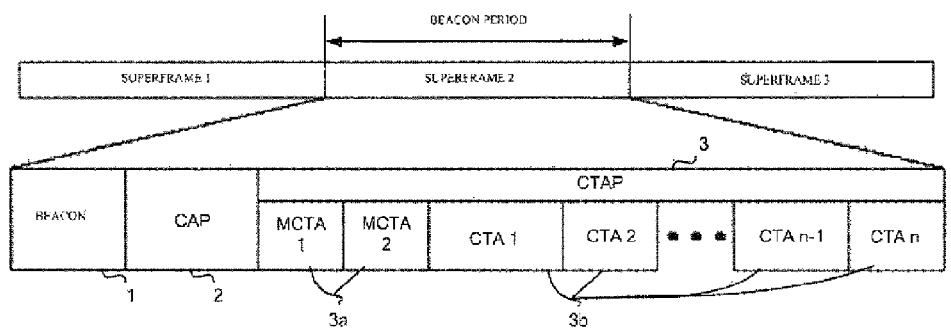
FIG. 2a shows a time division scheme based on IEEE 802.15.3.
Figure 2B:
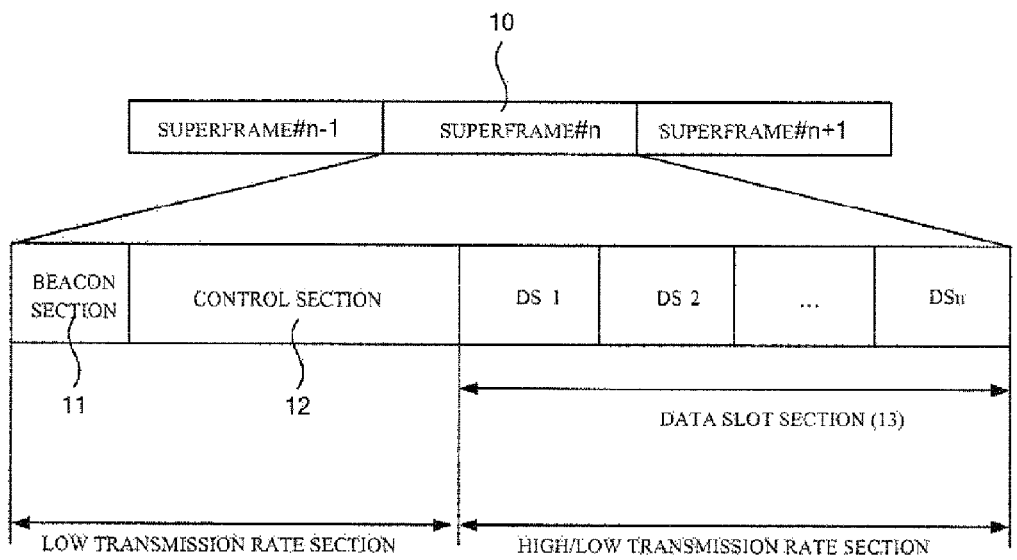
FIG. 2b shows a time division scheme according to an exemplary embodiment of the present invention.

The time division scheme according to the present invention is based on a time division scheme defined by IEEE 802.15.3 standards. FIG. 2a shows a conventional time division scheme based on IEEE 802.15.3, and FIG. 2b shows a time division scheme according to the present invention.

The MAC defined by IEEE 802.15.3 is characterized in that it can quickly establish a wireless network and that it is not based on an AP (Access Point), but an ad hoc network, also referred to as a piconet, which has a PNC (Piconet Coordinator) as a key component. In a time-based arrangement structure shown in FIG. 2a, which is called a superframe, time sections for transmitting/receiving data between devices are arranged. The superframe includes a beacon section 1 containing control information, a CAP (Contention Access Period) section 2 for transmitting data by using backoff, and a CTAP (Channel Time Allocation Period) section 3 for transmitting data without contention for an allocated period of time. Both CAP 2 and MCTA 3a adopt a contention access scheme. Particularly, the CAP 2 adopts a CSMA/CA (Carrier Sense Multiple Access/Collision Avoidance) scheme, and the MCTA adopts a slotted aloha scheme.

The CTAP 3 includes a number of CTAs (Channel Time Allocations) 3b in addition to the MCTA 3a. The CTAs 3b have two types: a dynamic CTA and a pseudo-static CTA. The dynamic CTA may vary its location in every superframe and, once the beacon is lost, the CTA cannot be used in the corresponding superframe. In contrast, the pseudo-static CTA remains fixed at the same location and, even if the beacon is lost, the CTA section can be used at the fixed location. However, if the beacon is lost a consecutive number of times corresponding to 'mMaxLostBeacons,' the CAT section is not allowed to be used, even in the case of the pseudo-static CTA.

As such, the MAC following IEEE 802.15.3 is based on TDMA (Time Division Multiple Access), which guarantees stable QoS (Quality of Service), and is particularly suited to multimedia AV streaming in home networks. However, there is still room for improvement in order to transmit AV data in a high-frequency band of tens of GHz.

In general, MAC frames transmitted/received between devices in a network include a data frame and a control frame.

The control frame refers to any type of frame for aiding transmission of the data frame, but not the data frame itself. For example, the control frame includes an association request frame for requesting participation in a network established by a network coordinator, a data slot request frame for requesting a data slot for transmitting isochronous data, a probe request frame for requesting a network search, a coordinator handover request frame for handing over the role of a coordinator, and frames for responding to these frames. The control frame also includes an ACK (acknowledgement) frame for acknowledging that a frame has been properly transmitted.

However, in the case of IEEE 802.15.3, the size of a data frame does not greatly differ from that of a control frame. Particularly, the data frame has a maximum size of 2048 bytes, and the control frame has a size of tens or hundreds of bytes. However, in order to transmit asynchronous data in a band of tens of GHz, the data frame size increases to a large extent while the control frame size remains the same. As a result, it is inefficient to follow the conventional IEEE 802.15.3 scheme shown in FIG. 2a with no modification.

In the case of a conventional CAP 2 and an MCTA 3a based on IEEE 802.15.3, various control frames and asynchronous data frames contend for access to the channel. This means that various control frames may reduce the opportunity to transmit asynchronous data frames.

In addition, asynchronous data requires channel allocation management, such as allocating additional channels based on the condition of transmission channels or that of wireless devices transmitting asynchronous data (addition of data slots), or returning already allocated channels (return of data slots). However, the conventional IEEE 802.15.3 structure shown in FIG. 2a is not adapted for such channel allocation management.

FIG. 2b shows a time-based arrangement structure for the above-mentioned channel allocation management (addition and return of data slots), i.e. a superframe 10.

The superframe 10 includes a beacon section 11 for transmitting a beacon frame containing control information, a control section 12, via which various control frames are transmitted in contention, and a data slot section 13 for transmitting asynchronous data without contention for an allocated period of time. The control section 12 may follow a CSMA/CA scheme or a slotted aloha scheme.

The data slot section 13 includes a number of data slots DS1, DS2, ..., DSn. As in the case of conventional superframes, the data slots have two types: dynamic data slots and pseudo-static data slots.

The control section 12 is used to transmit/receive a frame for channel allocation management between the network coordinator and a wireless device so that asynchronous data is transmitted via the data slot section 13. The frame for channel allocation management includes a frame for requesting addition of data slots and a frame for returning data slots. In addition, the above-mentioned various control frames are transmitted/received via the control section 12.

The beacon and control sections 11 and 12 are used to transmit various frames at a low transmission rate. The data slot section 13 is used to transmit frames at a high or low transmission rate. The difference between high and low transmission rates may be based on the data modulation type.

A channel adapted for a high transmission rate is a unidirectional link, and is commonly used for the purpose of unicast connection and uncompressed isochronous data transmission. When a frame is transmitted at a high transmission rate, antenna steering technology may be used to improve the directionality. To this end, a frame having antenna steering information may be transmitted/received via the data slot section 13.

A channel adapted for a low transmission rate is a bidirectional ink, and is commonly used for the purpose of unicast connection or broadcast connection. In addition, asynchronous data, various control frames, and antenna steering information may be transmitted/received via a data channel at a low transmission rate.

The beacon section 11 is used to transmit a beacon frame via a channel adapted for a low transmission rate, and the beacon frame is used for network time synchronization. The beacon frame contains information regarding channels allocated to respective devices, i.e. information regarding data slots.

The control section 12 is used to transmit/receive various MAC control frames via a channel adapted for a low transmission rate. The control frames include a control frame necessary for initialization, a control frame for channel allocation management, a control frame necessary to share antenna steering information, and an ACK frame. An asynchronous data frame may also be transmitted/received, and it includes an uncompressed video/audio data frame and an upper-layer control frame. The upper-layer control frame includes an application layer above the MAC layer, or a control data frame received from a remote control.

The control frame necessary for initialization is used for channel switching and device discovery. The control frame for channel allocation management includes frames for adding and returning data slots.

The data slot section 13 is used to transmit/receive uncompressed isochronous data between devices via a channel adapted for a high transmission rate. For example, the uncompressed isochronous data may be real-time AV streaming data. In this case, a delay bound exists for the purpose of real-time AV streaming. The ACK frame and the antenna steering information may be transmitted/received via a channel adapted for a low transmission rate, and the asynchronous data frame, which is transmitted/received via the control section 12, may also be transmitted/received via the allocated data slot.

Figure 2C:
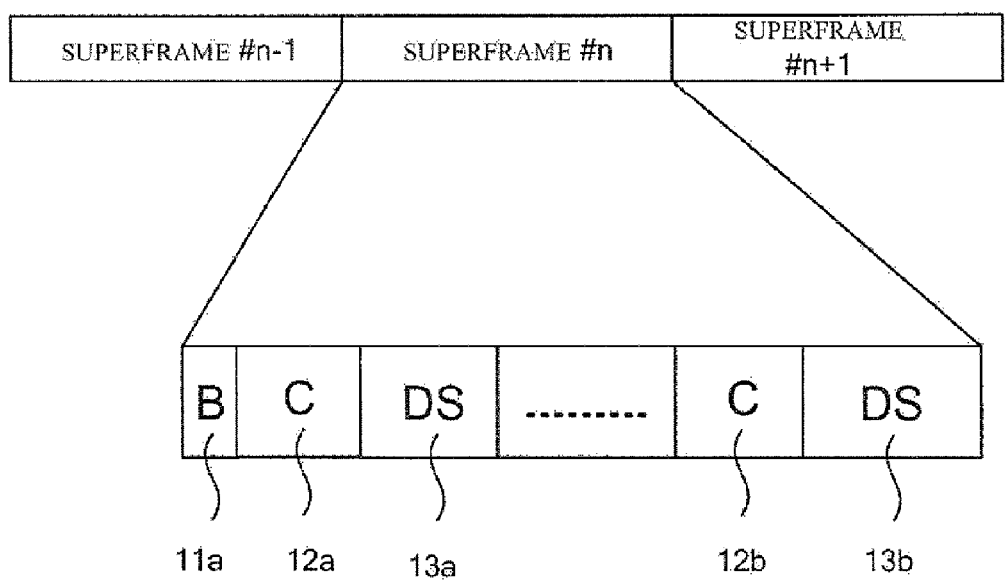
FIG. 2c shows a time division scheme according to another exemplary embodiment of the present invention.

FIG. 2c shows the structure of a superframe according to another exemplary embodiment of the present invention. Unlike the structure shown in FIG. 2b, a single superframe has a beacon section B 11a, at least two control sections C 12a and 12b, and data slot sections 13a and 13b.

Such a superframe structure ensures that, when a plurality of control sections and data slot sections are designated in a single superframe, it is possible to minimize the time delay phenomenon of asynchronous data transmission, which may occur when a frame for data slot allocation fails to be transmitted via a specific control section.

Figure 3:
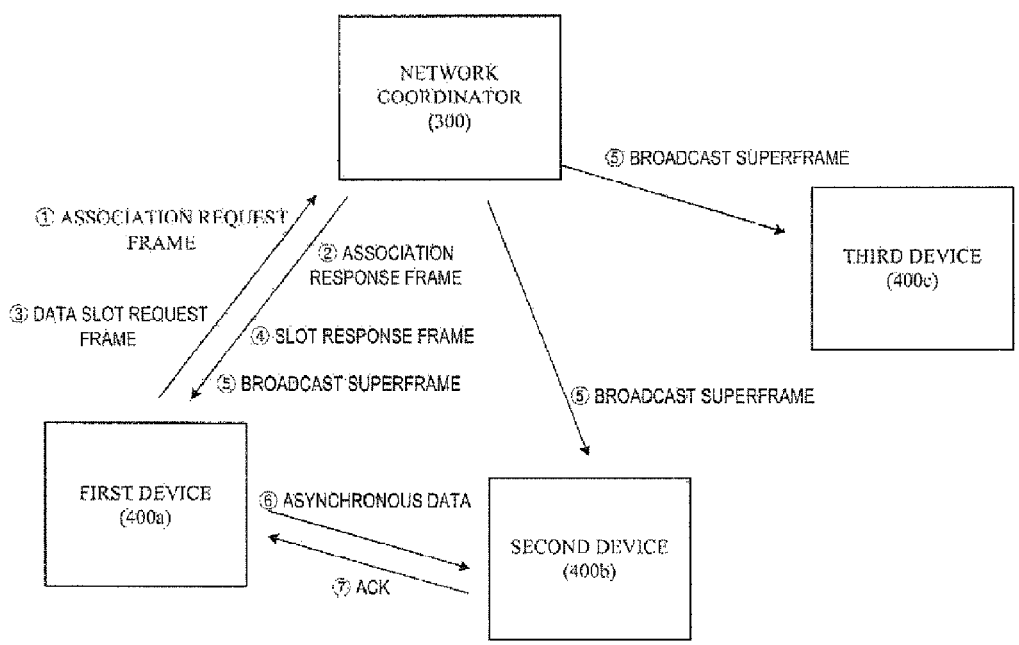
FIG. 3 briefly shows an environment to which the present invention is applied.

FIG. 3 briefly shows an environment to which the present invention is applied.

Referring to FIG. 3, a network coordinator 300 and at least one device 400a, 400b, and 400c constitute a single network. For example, the network coordinator 300 may be a display device as a sink device for AV data, or a media storage device such as a PVR (Personal Video Recorder). The devices 400a, 400b, and 400c may be source devices or sink devices, particularly a set-top box, a DVD, and a speaker. These devices employ a high-frequency band of tens of GHz so as to transmit asynchronous data.

The network coordinator 300 broadcasts a superframe periodically, i.e., for each beacon period. Based on the broadcasting, the devices 400a, 400b, and 400c can transmit control, data, and ACK frames within the control section 12 or the data slot section 13 included in the superframe.

When the first device 400a wants to participate in the network, although it has not participated initially, an association request frame is transmitted to the network coordinator 300 via the control section 12 of the superframe 10 while competing with other devices 400b and 400c (①), and an association response frame is received accordingly (②).

After the association request of the first device 400a is accepted in response to the association response frame, the first device 400a becomes a member of the network. If the first device 400a wants to transmit asynchronous data to the second device 400b, the first device 400a requests the network coordinator 300 that a data slot for transmitting the asynchronous data be provided. When the first device 400a transmits such a data slot request frame to the network coordinator 300 via the control section 12 while competing with other devices 400b and 400c (③), the network coordinator 300 transmits a data slot response frame to the first device 400a (④).

After transmitting the data slot response frame 70 to the first device 400a, the network coordinator 300 broadcasts a superframe, including data slots allocated to the devices 400a, 400b, and 400c, for the next beacon period (⑤).

The network coordinator 300 allocates a data slot to the first device 400a based on the broadcasted superframe. Then, asynchronous data can be transmitted to a receiver device 400b during the allocated data slot (⑥). The second device 400b can transmit an ACK frame to the first device 400b in response to the transmitted asynchronous data (⑦). However, considering the characteristics of asynchronous data, some amounts of errors do not seriously affect played images. Therefore, the ACK frame is unnecessary, i.e. "No ACK policy" may be followed. Even when the ACK frame is transmitted, the ACK frame may not be transmitted via the data slot according to the present invention. In order to use the data slot for efficient transmission of asynchronous data, it is preferred to transmit the ACK frame under contention via the control section 12, as in the case of other control frames.

Figure 4:
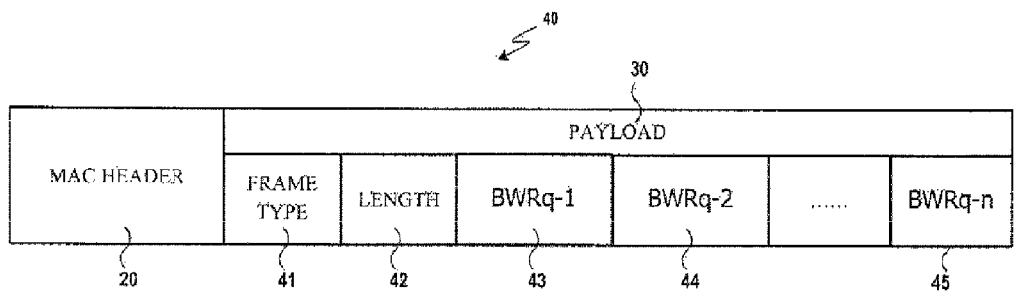

FIGS. 4, 5a, and 5b show the construction of data slot management slots according to exemplary embodiments of the present invention, respectively.

Referring to FIG. 4, a data slot management frame 40 according to an exemplary embodiment of the present invention includes an MAC header 20 and a payload 30, as in the case of other MAC control frames. The payload 30 includes a frame type field 41, a length field 42, and a plurality of data slot fields 43, 44, and 45.

The frame type field 41 keeps a record of identification information regarding whether the frame is for the purpose of adding or returning a data slot. In other words, information recorded in the frame type field 41 determines the type of the data slot management frame. The length field 42 keeps a record of the total byte number of following fields 43, 44, and 45.

The data slot management frame 40 includes a plurality of data slot fields 43, 44, and 45, each of which keeps a record of information regarding addition or return of a data slot. This means that requests for addition or return of a plurality of data slots for transmission of plural pieces of asynchronous data can be made simultaneously, and the data slot fields have a structure shown in FIG. 5.

Referring to FIG. 5a, the data slot fields include a 'Stream index' field 51, a 'Stream request ID' field 52, a 'Min_BW' field 53, a 'Number of time blocks' field 54, a 'Time block duration' field 55, and a 'Priority' field 58.

The 'Stream index' field 51 keeps a record of stream identification information, i.e. identification information regarding asynchronous data to be transmitted. The stream identification information is used to process the corresponding stream.

The 'Stream request ID' field 52 carries identification information regarding a frame for requesting addition or return of a data slot which is used before the stream identification information is given. If the data slot requests that the current stream be modified or terminated, the value of the 'Stream request ID' field 52 is set to zero, and may be ignored by the receiving side. If the data slot requests asynchronous data, the value of the 'Stream request ID' field 52 is set to zero, and may be ignored by the receiving side in a similar manner.

The 'Min_BW' field 53 designates the minimum bandwidth which must be guaranteed within a superframe in order to support a seamless streaming service, i.e. the minimum channel length to be guaranteed.

The 'Number of time blocks' field 54 designates the number of requested time blocks in terms of their bandwidth, i.e. the desired channel length.

The 'Time block duration' field 55 designates the unit bandwidth, i.e. the length of a unit channel. The 'priority' field 58 defines the priority among frames, which corresponds to the QoS level of streams or that for a special purpose.

FIG. 5b shows the structure of a data slot field according to another exemplary embodiment of the present invention. The data slot field includes a 'TrgtID' field 50a, a 'Stream request ID' field 51a, a 'Stream index' field 52a, a 'Number of time blocks' field 53a, a 'Time block duration' field 54a, a 'Minimum Schedule period' field 55a, a 'Maximum Schedule period' field 56a, and a 'Request control' field 57a. Among them, the 'Stream request ID' field 51a, the 'Stream index' field 52a, the 'Number of time blocks' field 53a, and the 'Time block duration' field 54a are the same as the corresponding fields shown in FIG. 5a.

The 'TrgtID' field 50a carries identification information regarding a device, to which another device transmits asynchronous data via an allocated channel i.e. allocated data slot.

The 'Minimum Schedule period' field 55a designates the minimum time allowed between the beginning time of two consecutive time blocks for data slot allocation.

The 'Maximum Schedule period' field 56a designates the maximum time allowed between the beginning time of two consecutive time blocks for data slot allocation.

The 'Request control' field 57a contains information regarding other details for data slot allocation, including information regarding the priority among frames and information regarding whether frames are transmitted via a high or low transmission rate section.

Figure 7A:
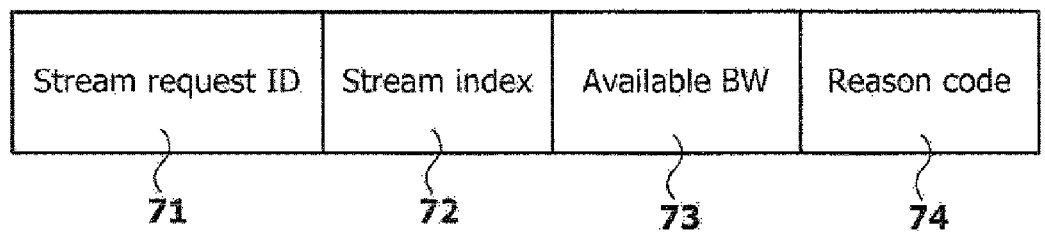
Figure 7B:
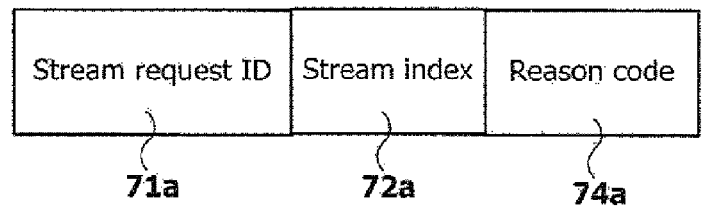

FIGS. 6, 7a, and 7b show the construction of response frames responding to data slot management frames according to exemplary embodiments of the present invention, respectively.

Referring to FIG. 6, a response frame 60 responding to a data slot management frame 40 according to an exemplary embodiment of the present invention includes an MAC header 20 and a payload 30 as in the case of other MAC control frames. The payload 30 includes a frame type field 61, a length field 62, and a plurality of response fields 63, 64, and 65.

The frame type field 61 keeps a record of identification information regarding whether the response frame responds to a request for addition or return of a data slot. In other words, information recorded in the frame type field 61 determines the type of the response frame. The length field 62 keeps a record of the total byte number of following fields 63, 64, and 65.

The response frame 60 responding to the data slot management frame 40 includes a plurality of response fields 63, 64, and 65, each of which keeps a record of response information regarding addition or return of a data slot. This means that responses to a plurality of requests can be made simultaneously, and the response fields have a structure shown in FIG. 7.

Referring to FIG. 7a, the response fields include a 'Stream request ID' field 71, a 'Stream index' field 72, an 'Available_BW' field 73, and a 'Reason_code' field 74.

The 'Stream request ID' field 71 contains identification information regarding a frame for requesting addition or return of a data slot. The 'Stream index' field 72 contains stream identification information, i.e. identification information regarding corresponding asynchronous data.

The 'Available_BW' field 73 contains information regarding actually allocated channels, i.e. actually allocated data slots. The 'Reason_code' field 74 contains information regarding whether or not a channel allocation request has been successfully made. If the channel allocation request has not been successfully made, information regarding the reason is recorded. Such a failure of the channel allocation request occurs when the maximum number of devices that can be coupled to the network coordinator has been reached, when data slots that can be allocated are insufficient, or when the channel condition is poor.

FIG. 7b shows the structure of a response field according to another exemplary embodiment of the present invention. The response field includes a 'Stream request ID' field 71a, a 'Stream index' field 72a, and a 'Reason_code' field 74a. The 'Available_BW' field 73 shown in FIG. 7a is omitted.

The 'Stream request ID' field 71a, the 'Stream index' field 72a, and the 'Reason_code' field 74a correspond to the 'Stream request ID' field 71, the 'Stream index' field 72, and the 'Reason_code' field 74 shown in FIG. 7a, respectively.

Figure 8:
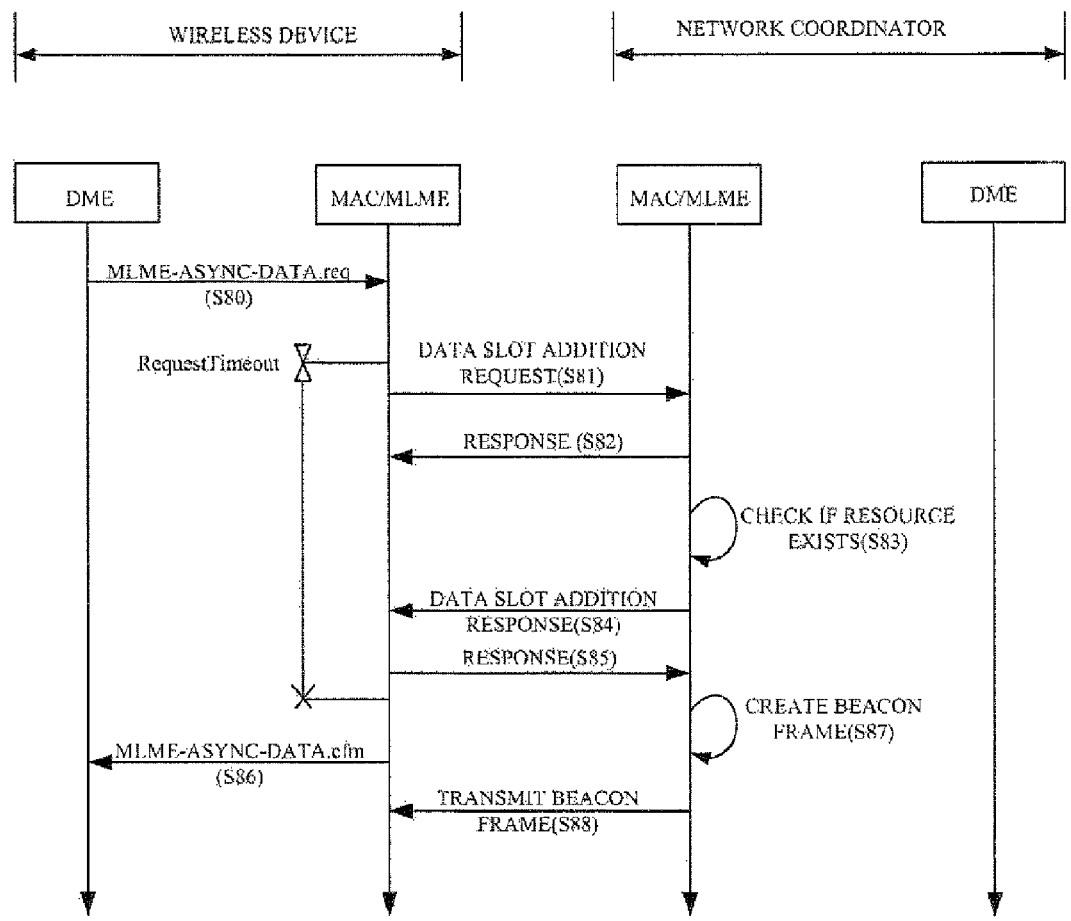
FIG. 8 shows a process for adding a data slot according to an exemplary embodiment of the present invention.

FIG. 8 shows a process for adding a data slot according to an exemplary embodiment of the present invention.

The DME (Device Management Entity) of a wireless device receives a transmission request of an upper layer, and calls an MLME-ASYNC-DATA.req message of its MAC/MLME (Mac Layer Management Entity) via a control section 12 (S80). The MAC/MLME transmits a data slot addition request frame to the network coordinator (S81). The data slot addition request frame has the same data structure as shown in FIGS. 4 and 5. The DME and MLME should be understood based on concepts defined by IEEE 802.15.3 standards.

The MAC/MLME of the network coordinator transmits an ACK frame in response to the data slot addition request frame (S82). The data slot addition request frame and its response may be made concurrently with a request for various pieces of asynchronous data and its response, as shown in FIGS. 4 and 6.

The network coordinator checks remaining resources, i.e. confirms whether or not a data slot for transmitting asynchronous data exists (S83). The result of the check is transmitted to the wireless device in the data structure type shown in FIGS. 6 and 7 within a 'RequestTimeout' time (S84). The MAC/MLME of the wireless device transmits an ACK frame to the network coordinator in response to the transmitted result (S85).

If the MAC/MLME of the wireless devices receives a response informing that a data slot has been added successfully (S84), the MAC/MLME transmits an MLME-ASYNC-DATA.cfm message to its DME so as to inform that a data slot has been added successfully (S86).

Considering that a beacon frame contains information regarding a data slot, steps S84 and S85 may be omitted. If no data slot can be added, a data slot addition request frame may be repeatedly transmitted after a predetermined period of time.

The MAC/MLME of the network coordinator creates a beacon frame containing information regarding the actually allocated data slot (S87), and transmits the created beacon frame to the MAC/MLME of the wireless device when the next superframe starts (S88).

After receiving the transmitted beacon frame, the wireless device transmits asynchronous data to the network coordinator or another wireless device via the data slot, which has been added to the data slot section.

Depending on the MAC structure, operations conducted by the MAC/MLME of the network coordinator may be conducted by the DME of the network coordinator instead.

Figure 9:
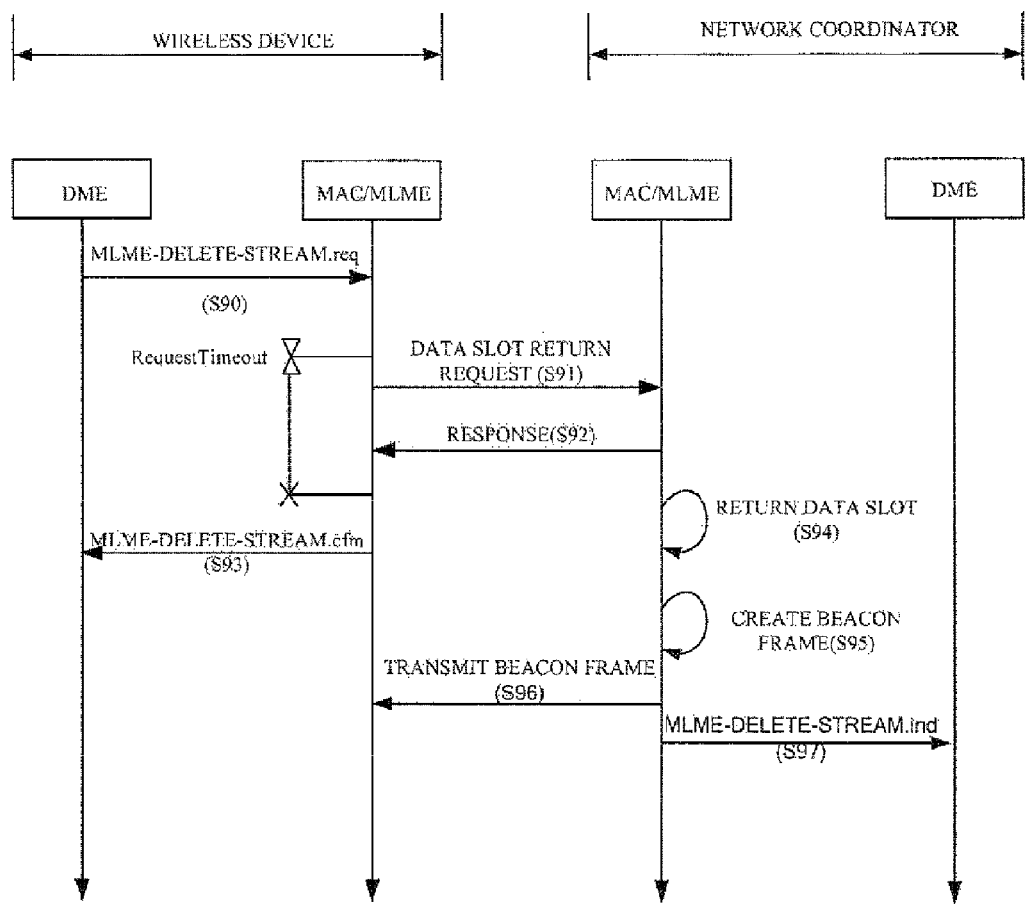
FIG. 9 shows a process for returning a data slot according to an exemplary embodiment of the present invention.

FIG. 9 shows a process for returning a data slot while asynchronous data is transmitted/received according to an exemplary embodiment of the present invention.

The DME of a wireless device receives a transmission request of an upper layer, and calls an MLME-DELETE-STREAM.req message of its MAC/MLME via a control section 12 (S90). The MAC/MLME transmits a data slot return request frame to the network coordinator (S91). The data slot return request frame has the same data structure as shown in FIGS. 4 and 5. The DME and MLME should be understood based on concepts defined by IEEE 802.15.3 standards.

The MAC/MLME of the network coordinator transmits an ACK frame in response to the data slot return request frame (S92). The data slot return request frame and its response may be made concurrently with a request for various pieces of asynchronous data and its response, as shown in FIGS. 4 and 6.

The MAC/MLME of the wireless device transmits an MLME-DELETE-STREAM.cfm message to its DME so as to inform that the data slot has been successfully returned (S93). The MAC/MLME of the network coordinator returns the corresponding data slot (S94), creates a beacon frame containing information regarding the actually returned data slot (S95), and transmits the created beacon frame to the MAC/MLME of the wireless device when the next superframe starts (S96).

As such, the returned data slot can be allocated again at the request of another wireless device and be used to transmit asynchronous data. In addition, the MAC/MLME of the network coordinator transmits an MLME-DELETE-STREAM.ind message to its DME so as to inform that the requested data slot has been returned (S97).

Figure 10:
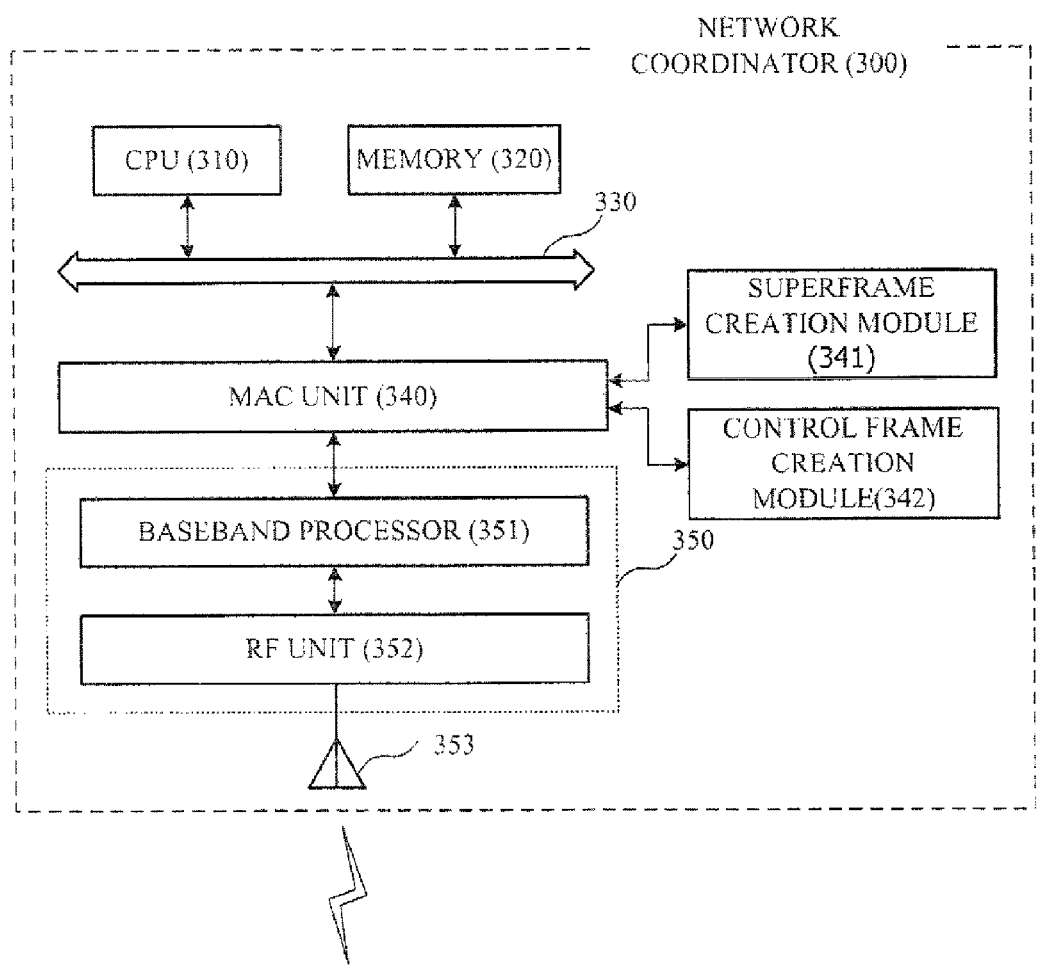
FIG. 10 shows the construction of a network coordinator according to an exemplary embodiment of the present invention.

FIG. 10 shows the construction of a network coordinator 300 according to an exemplary embodiment of the present invention.

The network coordinator 300 includes a CPU 310, a memory 320, an MAC unit 340, a PHY unit 350, a superframe creation module 341, a control frame creation module 342, and an antenna 353.

The CPU 310 controls other components connected to a bus 330, and is in charge of processing on the upper layer of the MAC layer. Particularly, the CPU 310 processes reception data, i.e. reception MSDU (MAC Service Data Unit), provided by the MAC unit 340, or creates transmission data (transmission MSDU), which is provided to the MAC unit 340.

The memory 320 stores the processed reception data or temporarily stores the created transmission data. The memory may consist of a non-volatile memory device (e.g. ROM, PROM, EPROM, EEPROM, flash memory), a volatile memory device (e.g. RAM), a storage medium (e.g. hard disk, optical disk), or anther type of device widely known in the art.

The MAC unit 340 adds an MAC header to the MSDU (i.e. multimedia data to be transmitted) provided by the CPU 310 so as to create an MPDU (MAC Protocol Data Unit), which is transmitted via the PHY unit 350. The MAC unit 340 removes the MAC header from the MPDU received via the PHY unit 350.

As such, the MPDU transmitted by the MAC unit 340 includes a superframe transmitted for the beacon period. The MPDU received by the MAC unit 340 includes an association request frame, a data slot management frame (i.e. frame for requesting addition or return of a data slot), and other types of control frames.

The superframe creation module 341 creates a superframe, as mentioned above, and provides the MAC unit 340 with it. The control frame creation module 342 creates an association request frame, a data slot management frame, and other types of control frames and provides them to the MAC unit 340.

The PHY unit 350 adds a signal field and a preamble to the MPDU provided by the MAC unit 340 so as to create a PPDU (i.e. data frame), which is converted into a wireless signal and transmitted via the antenna 353. The PHY unit 350 may include a baseband processor 351 for processing baseband signals and an RF (Radio Frequency) unit 352 for creating actual wireless signals from the processed baseband signals and transmitting them into the air via the antenna 353.

More particularly, the baseband processor 351 conducts frame formatting, channel coding, etc. The RF unit 352 conducts analog wave amplification, analog/digital signal conversion, modulation, etc.

Figure 11:
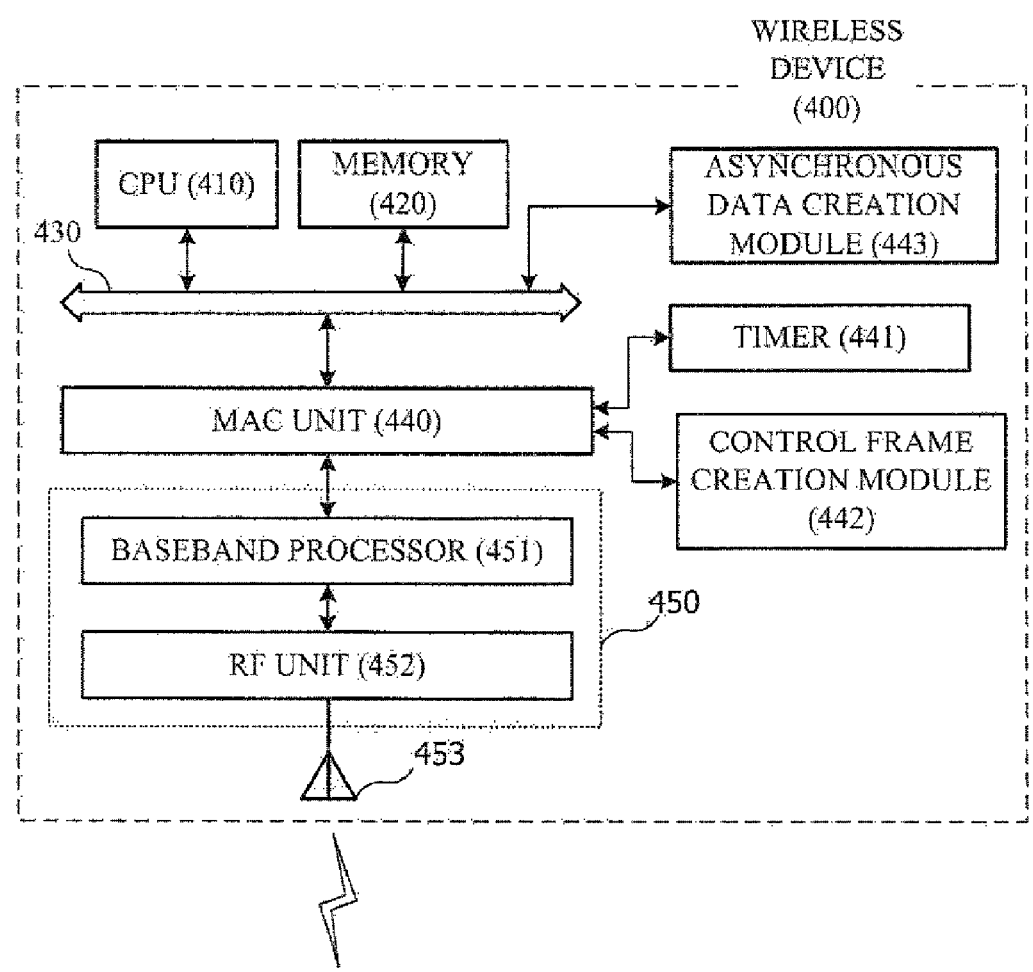
FIG. 11 shows the construction of a wireless device according to an exemplary embodiment of the present invention.

FIG. 11 shows the construction of a wireless device 400 according to an exemplary embodiment of the present invention. Among components of the wireless device 400, the MAC unit 440, the memory 420, and the PHY unit 450 have the same basic function as in the case of the network coordinator 300.

The timer 441 is used to determine when a contention or contention-free section included in the superframe starts and ends. The control frame creation module 442 creates an association request frame, a data slot management frame, and other types of control frames and provides them to the MAC unit 440.

The asynchronous data creation module 443 can record and create asynchronous data (e.g. AV data) in an uncompressed type. For example, the asynchronous data creation module 443 may record video data including RGB component values of the video data.

The MAC unit 440 adds an MAC header to provided asynchronous data or to a control frame so as to create an MPDU, which is transmitted via the PHY unit 450 when the corresponding time of the superframe arrives.

As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules. In addition, the elements and modules may be implemented to play at least one CPU inside a device or a security multimedia card.

As mentioned above, the present invention is advantageous in that, by providing a function for adding or returning a data slot for asynchronous data transmission, asynchronous data can be transmitted more efficiently without compressing it via a band of tens of GHz.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the exemplary embodiments described above should be understood as illustrative not restrictive in all aspects. The present invention is defined only by the scope of the appended claims and must be construed as including the meaning and scope of the claims, and all changes and modifications derived from equivalent concepts of the claims.

What is claimed is:

1. A method of managing channel allocation for asynchronous data transmission, the method comprising:
broadcasting a first superframe for a first beacon period, the first superframe containing a control section and a data slot section;
receiving a request frame from at least one wireless device belonging to a network via the control section, the request frame requesting additions of data slots for asynchronous data transmission;
transmitting a response frame to the at least one wireless device via the control section in response to the request frame; and
broadcasting a second superframe for a second beacon period, the second superframe containing information regarding the requested data slot, if the requested data slot is added, to the at least one wireless device,
wherein the request frame comprises a plurality of first fields, each of which keeps a record of information regarding addition of a data slot, the response frame comprises a plurality of second fields, each of which keeps a record of response information regarding addition of a data slot, and
wherein each of the second fields of the response frame comprises information regarding a reason the requested data slot fails to be added if the requested data slot fails to be added.

2. The method of claim 1, wherein communication with the at least one wireless device is conducted via a millimeter wave channel.

3. The method of claim 1, wherein the first superframe comprises a first contention section and a first contention-free section, and the second superframe comprises a second contention section and a second contention-free section, the first contention section comprises the control section and the data slot section, and the second contention-free section comprises a control section of the second superframe and a data slot section of the second superframe.

4. The method of claim 1, wherein each of the first fields of the request frame comprises at least one of identification information regarding asynchronous data to be transmitted, identification information regarding the request frame, and information regarding a minimum channel length to be guaranteed.

5. The method of claim 1, wherein each of the second fields of the response frame further comprises at least one of identification information regarding asynchronous data to be transmitted, identification information regarding the request frame, and information regarding the added data slot.

6. The method of claim 1, wherein the asynchronous data is uncompressed data.

7. A method of transmitting asynchronous data, the method comprising:
receiving a first superframe from a network coordinator for a first beacon period, the first superframe containing a control section and a data slot section;
transmitting a request frame to the network coordinator within the control section, the request frame requesting additions of data slots for transmission of asynchronous data;
receiving a response frame from the network coordinator within the control section in response to the request frame;
receiving a second superframe from the network coordinator for a second beacon period, the second superframe containing information regarding an added data slot; and
transmitting corresponding asynchronous data via the added data slot,
wherein the request frame comprises a plurality of first fields, each of which keeps a record of information regarding addition of a data slot, the response frame comprises a plurality of second fields, each of which keeps a record of response information regarding addition of a data slot,
wherein each of the second fields of the response frame comprises information regarding a reason the requested data slot fails to be added if the requested data slot fails to be added.

8. The method of claim 7, wherein communication with a wireless device is conducted via a millimeter wave channel.

9. The method of claim 7, wherein the first superframe comprises a first contention section and a first contention-free section and the second superframe comprises a second contention section and a second contention-free section, the first contention section comprises the control section of the first superframe, the second contention section comprises a control section of the second superframe, and the first contention-free section comprises the data slot section of the first superframe, and the second contention-free section comprises a data slot section of the second superframe.

10. The method of claim 7, wherein each of the first fields of the request frame comprises at least one of identification information regarding asynchronous data to be transmitted, identification information regarding the request frame, and information regarding a minimum channel length to be guaranteed.

11. The method of claim 7, wherein the asynchronous data is uncompressed data.

12. A method of managing channel allocation for asynchronous data transmission, the method comprising:
broadcasting a first superframe for a first beacon period, the first superframe containing a control section and a data slot section;
receiving a request frame from at least one wireless device belonging to a network via the control section, the request frame requesting returns of data slots for asynchronous data transmission;
transmitting a response frame to the at least one wireless device via the control section in response to the request frame; and
broadcasting a second superframe for a second beacon period, the second superframe containing information regarding the requested data slots returned, to the at least one wireless device,
wherein the request frame comprises a plurality of first fields, each of which keeps a record of information regarding an addition of a data slot, the response frame comprises a plurality of second fields, each of which keeps a record of response information regarding addition of a data slot,
wherein each of the second fields of the response frame comprises information regarding a reason the requested data slot fails to be added if the requested data slot fails to be added.

13. The method of claim 12, wherein communication with the at least one wireless device is conducted via a millimeter wave channel.

14. The method of claim 12, wherein the first superframe comprises a first contention section and a first contention-free section, and the second superframe comprises a second contention section and a second contention-free section, the first contention section comprises the control section of the first superframe, and the second contention section comprises a control section of the second superframe, and the first contention-free section comprises the data slot section of the first superframe, and the second contention-free section comprises a data slot section of the second superframe.

15. The method of claim 12, wherein the asynchronous data is uncompressed data.

16. An apparatus for allocating a data slot for asynchronous data transmission, the apparatus comprising:
a first broadcast unit which broadcasts a first superframe for a first beacon period, the first superframe containing a control section and a data slot section;
a reception unit which receives a request frame within the control section from at least one wireless device belonging to a network, the request frame requesting additions of data slots for asynchronous data transmission;
a transmission unit which transmits a response frame within the control section to the at least one wireless device in response to the request frame; and
a second broadcast unit which broadcasts a second superframe for a second beacon period, the second superframe containing information regarding the requested data slots, if the requested data slots are added, to the at least one wireless device,
wherein the request frame comprises a plurality of first fields, each of which keeps a record of information regarding addition of a data slot, the response frame comprises a plurality of second fields, each of which keeps a record of response information regarding addition of a data slot,
wherein each of the second fields of the response frame comprises information regarding a reason the requested data slot fails to be added if the requested data slot fails to be added.

17. An apparatus for allocating a data slot for asynchronous data transmission, the apparatus comprising:
a first broadcast unit which broadcasts a first superframe for a first beacon period, the first superframe containing a control section and a data slot section;
a reception unit which receives a request frame within the control section from at least one wireless device belonging to a network, the request frame requesting returns of data slots for asynchronous data transmission;
a transmission unit which transmits a response frame within the control section to the at least one wireless device in response to the request frame; and
a second broadcast unit which broadcasts a second superframe for a second beacon period, the second superframe containing information regarding the requested data slot returned, to the at least one wireless device,
wherein the request frame comprises a plurality of first fields, each of which keeps a record of information regarding an addition of a data slot, the response frame comprises a plurality of second fields, each of which keeps a record of response information regarding addition of a data slot,
wherein each of the second fields of the response frame comprises information regarding a reason the requested data slot fails to be added if the requested data slot fails to be added.

18. An apparatus for transmitting asynchronous data, the apparatus comprising:
a reception unit which receives a first superframe from a network coordinator for a first beacon period, the first superframe containing a control section and a data slot section;
a first transmission unit which transmits a request frame within a control section contained in the first superframe to the network coordinator, the request frame requesting additions of data slots for asynchronous data transmission;
a reception unit which receives a response frame from the network coordinator within the control section in response to the request frame;
a reception unit which receives a second superframe from the network coordinator for a second beacon period, the second superframe containing information regarding an added data slot, and
a second transmission unit which transmits asynchronous data via the added data slot,
wherein the request frame comprises a plurality of first fields, each of which keeps a record of information regarding addition of a data slot, the response frame comprises a plurality of second fields, each of which keeps a record of response information regarding addition of a data slot,
wherein each of the second fields of the response frame comprises information regarding a reason the requested data slot fails to be added if the requested data slot fails to be added.

19. A method of transmitting asynchronous data, the method comprising:
- receiving a request frame from at least one device connected to a network via a first beacon section, the request frame requesting asynchronous data transmission;
- transmitting a response frame to the at least one device connected to the network in response to the request frame; and
- transmitting asynchronous data to the at least one device connected to the network based on the response frame,
- wherein the request frame comprises a plurality of first fields, each of which keeps a record of information regarding an addition of a data slot for asynchronous data transmission, the response frame comprises a plurality of second fields, each of which keeps a record of response information regarding addition of a data slot,
- wherein each of the second fields of the response frame comprises information regarding a reason the requested data slot fails to be added if the requested data slot fails to be added.

20. The method of claim 19, wherein each of the first fields of the request frame comprises at least one of identification information regarding asynchronous data to be transmitted, identification information regarding the request frame, and channel information regarding a requested channel.

21. The method of claim 20, wherein the channel information comprises information regarding a requested channel number and information regarding a unit channel length.

22. The method of claim 19, wherein the request frame comprises identification information regarding the at least one wireless device receiving the asynchronous data.

23. The method of claim 19, wherein each of the second fields of the response frame further comprises at least one of identification information regarding asynchronous data, and identification information regarding the request frame.

* * * * *